(No Model.)
W. SMITH.
PITMAN BOX.
No. 537,491. Patented Apr. 16, 1895.
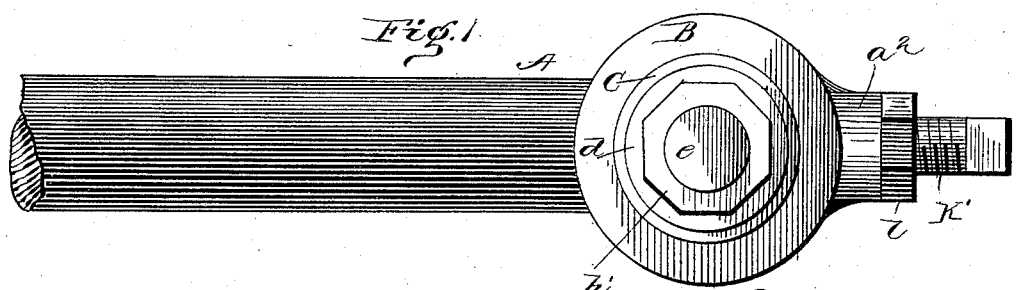
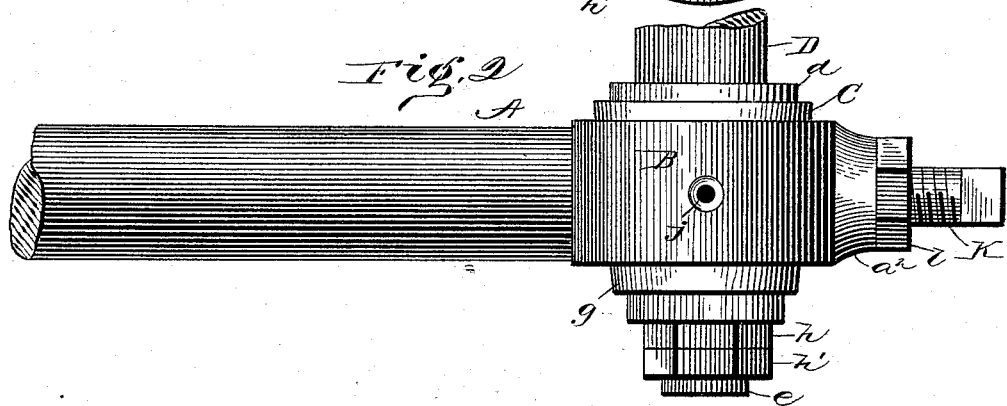
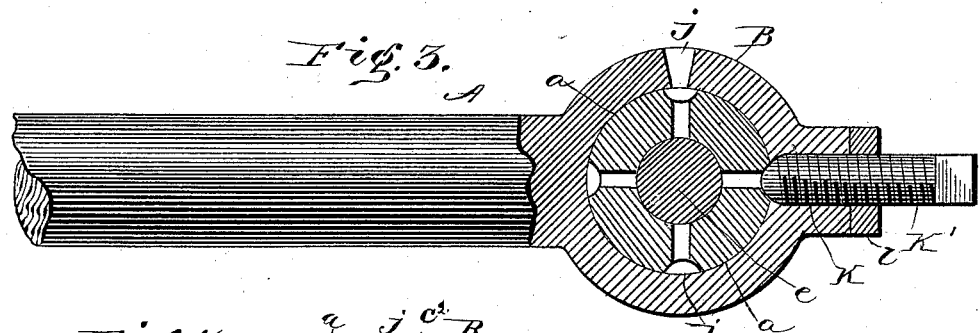
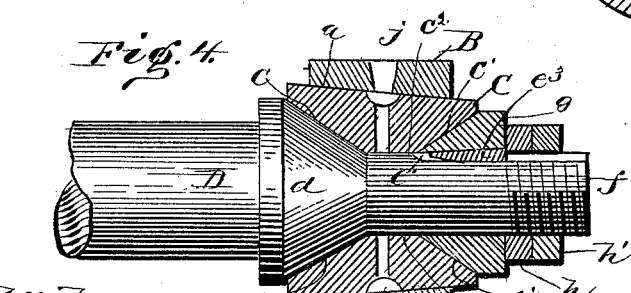
Witnesses:
J. M. Fowler
R. E. Rabbitt
Inventor:
William Smith
By John S. Duffie
Attorney.

UNITED STATES PATENT OFFICE.

WILLIAM SMITH, OF DRAKE'S CREEK, ARKANSAS.

PITMAN-BOX.

SPECIFICATION forming part of Letters Patent No. 537,491, dated April 16, 1895.

Application filed January 19, 1895. Serial No. 535,488. (No model.)

*To all whom it may concern:*

Be it known that I, WILLIAM SMITH, a citizen of the United States, residing at Drake's Creek, in the county of Madison and State of Arkansas, have invented certain new and useful Improvements in Pitmen and Pitmen-Boxes; and I do hereby declare the following to be a full, clear, and exact description of the invention, such as will enable others skilled in the art to which it appertains to make and use the same.

My invention is an improved adjustable and reversible bearing, in combination with a pitman box, and the parts hereinafter described.

In the accompanying drawings: Figure 1 is an end view of the box and of the wrist pin. Fig. 2 is a top view of the box and a longitudinal view of the wrist pin. Fig. 3 is a cross sectional view of the box, and of the wrist pin except the end $a^2$, of the wrist which also is in section. Fig. 4 is a longitudinal sectional view of the box and a perspective view of the box axle.

My invention is intended to be used on mowers, reapers and all machinery where a pitman rod and pitman box may be used.

My invention is described as follows:

A, represents the pitman head to which the pitman may be applied by any known mechanical means.

B, is the casing and is integral with the pitman head A. The opening in said casing is conical.

C, is the reversible conical bearing, that is, the outer face of the same is conical and fits the conical opening $a$, in the casing B. The conical bearing C, has three inner surfaces. At one end it has the larger conical opening $c$, and at the other the smaller conical opening $c'$, the smaller ends of these two conical openings being inward, and then it has the central straight opening $c^2$.

The pin D, is provided with a conical shoulder $d$, which fits the larger conical opening $c$, of the conical bearing C. Said shoulder terminates in a spindle $e$, the outer end of which is provided with screw threads $f$. A conical shaped bearing $g$, fits the conical opening $c'$, of the bearing C, while its inner face fits the spindle $e$. In said spindle is a groove $e'$, and in said bearing $g$, is a corresponding groove $e^2$, and between these grooves is a wedge $e^3$, to prevent the bearing $g$, from turning on the spindle $e$. On the threaded end of the spindle $e$, works a nut $h$, and a jam nut $h'$.

$j$, are oil holes in which may be mounted an oil cup.

The end $a^2$, of the pitman head A, is provided with a threaded opening $k$, in which works a threaded bolt $k'$, and on this threaded bolt works a jam nut $l$.

My invention is operated as follows: Take up the slack when caused by wear by screwing up the nut $h$, and jam nut $h'$. This forces the bearing $g$, into the conical opening $c'$, and also draws the conical shoulder $d$, into the conical opening $c$. In order to prevent the bearing C, from wearing oblong, it may be moved around one quarter either way in the casing B. To do this I loosen the jam nut $l$, and then turn back the threaded bolt $k'$. Then I turn the bearing C, around one quarter until the next oil hole comes opposite the point of the bolt $k'$. Then I secure it by turning the bolt in and screwing up the jam nut $l$. This prevents said bearing C, from being worn oblong. It should be turned one quarter each day it is used. Thus the said bearing is kept perfectly round and lost motion prevented. The said bearing is also reversible. It may be turned end for end, and when too much worn for slack motion to be taken up may be removed and a new one put in its place.

Having described my invention, what I claim as new, and desire to secure by Letters Patent, is—

In a pitman box, substantially as shown and described, the bearing C, provided with an outward conical surface, the inward conical surfaces $c$ and $c'$, the central straight surface $c^2$, and oil holes $j$, in combination with the pin D, having the conical shoulder $d$; spindle $e$, having the key seat $e'$, and threads $f$; bearing $g$, having the key seat $e^2$, and fitting on said spindle, and in conical opening $c'$; key $e^3$, fitting between said key seats; nuts $h$ and $h'$, working on threads $f$; casing B, having the oil hole $j$, and fitting around the conical bearing C; threaded bolt $k'$, working in threaded opening $k$, in the end $a^2$, adapted to enter the outer end of one of the oil holes $j$; jam nut $l$, fitting on the bolt $k'$, substantially as shown and described and for the purposes set forth.

In testimony whereof I affix my signature in presence of two witnesses.

WILLIAM SMITH.

Witnesses:
 E. H. SHIPLEY,
 ALEX M. JOHNSON.